W. DENNIS.
CLUTCH.
APPLICATION FILED NOV. 2, 1908.
925,760.
Patented June 22, 1909.
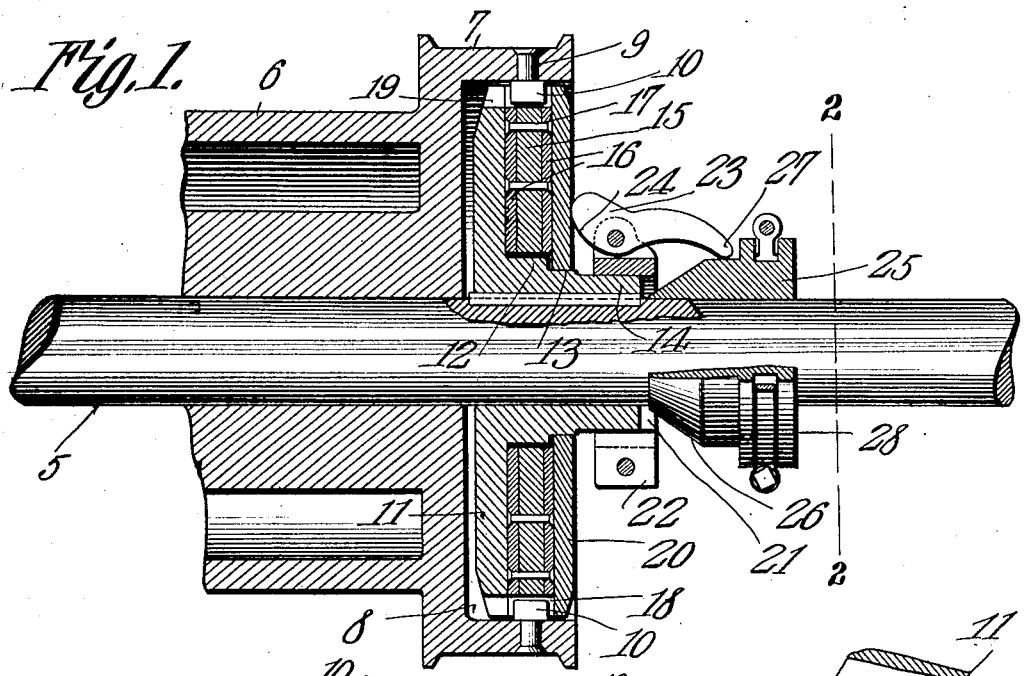
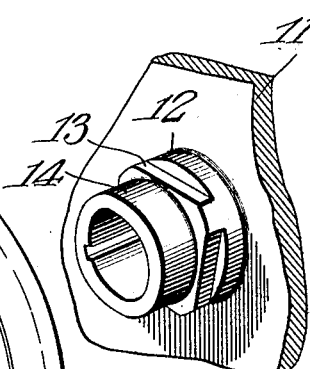
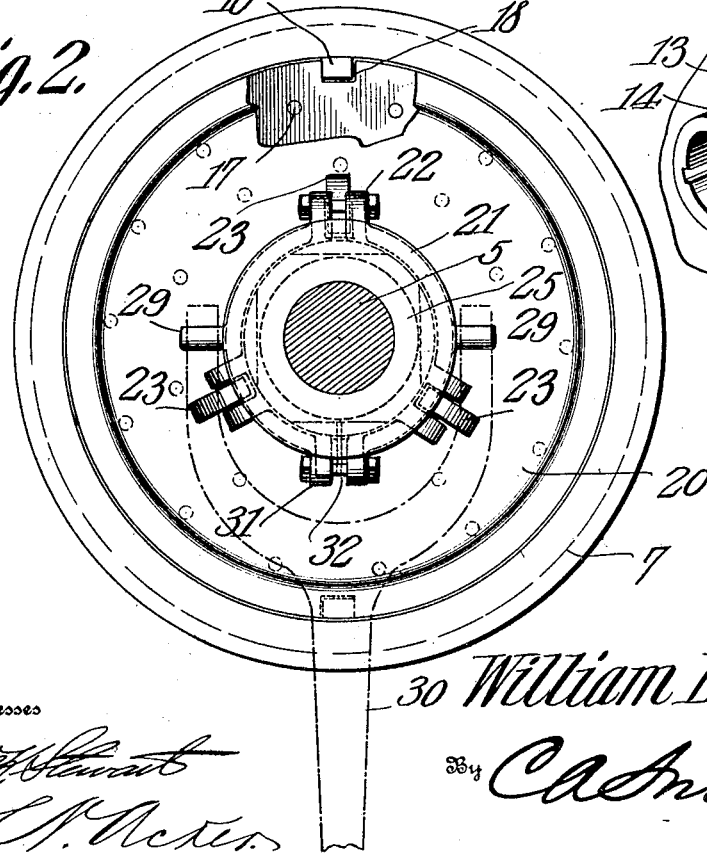
Inventor
William Dennis.

UNITED STATES PATENT OFFICE.

WILLIAM DENNIS, OF MILWAUKEE, WISCONSIN.

CLUTCH.

No. 925,760.   Specification of Letters Patent.   Patented June 22, 1909.

Application filed November 2, 1908. Serial No. 460,720.

*To all whom it may concern:*

Be it known that I, WILLIAM DENNIS, a citizen of the United States, residing at Milwaukee, in the county of Milwaukee and State of Wisconsin, have invented a new and useful Clutch, of which the following is a specification.

This invention relates to friction clutches and has for its object to provide a comparatively simple and thoroughly efficient device of this character especially designed for transmitting motion from a driving shaft to a hoisting drum or other driven member.

A further object of the invention is to provide a friction clutch including a drum loosely mounted on the driving shaft and having an annular chamber formed in one end thereof for the reception of a plurality of power transmitting disks, one of said disks being keyed to the driving shaft and adapted to transmit motion from said shaft to the drum when the remaining disks are moved into frictional engagement therewith.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a longitudinal sectional view of a clutch constructed in accordance with my invention. Fig. 2 is a transverse sectional view taken on the line 2—2 of Fig. 1. Fig. 3 is a detail perspective view of a portion of the relatively stationary friction disk showing the construction of the hub.

Similar numerals of reference indicate corresponding parts in all of the figures of the drawings.

The improved clutch forming the subject matter of the present invention includes a driving member or shaft 5, on which is loosely mounted for rotation a driven member, preferably in the form of a hoisting drum 6. One end of the drum 6 is extended longitudinally to form an annular flange 7 defining a terminal chamber 8, there being a plurality of pins or studs 9 carried by the flange 7 and provided with squared heads 10 extending within the chamber 8, as shown.

Keyed to the shaft 5 is a power transmitting member or disk 11 having a cylindrical hub 12 and a square shoulder 13, the hub 12 being extended longitudinally beyond the shoulder 13 to form an integral cylindrical extension or sleeve 14. Loosely mounted on the cylindrical portion 12 of the hub is another power transmitting device or disk 15, the latter consisting of a central metallic plate having its opposite faces covered with a thin strip of vegetable fiber or similar material 16. The fiber strips 16 form bearing surfaces and are secured to the central metallic plate of the disk by rivets or similar fastening devices 17.

Formed in the intermediate metallic plate of the disk 15 are oppositely disposed recesses 18 adapted to receive the heads of the pins or studs 9, there being correspondingly shaped recesses 19 formed in the disk 11 so as to permit the heads 10 of the pins or lugs to enter the squared recesses 18 when the parts are assembled on the driving shaft.

Slidably mounted on the shoulder 13 and mounted for rotation with the hub 12 is a friction disk or plate 20 adapted to frictionally engage the member 15 and force the latter against the member 11, thereby to fix the several disks on the shaft 5 and thus transmit motion from the driving shaft through the medium of the pins 9 to the hoisting drum.

Mounted on the cylindrical portion 14 of the hub 12 is a split ring 21 having a plurality of spaced lugs 22 extending laterally therefrom and between which are pivotally mounted cam levers 23. The inclined or cam faces 24 of the levers are arranged to bear against the disk 20, while the rear ends of said levers are disposed in the path of movement of a shifting sleeve or spool 25. The shifting sleeve or spool 25 is provided with an inclined face 26 adapted to bear against the terminals 27 of the cam levers and tilt the latter on their pivotal axis so as to force the cam faces of said levers against the adjacent disk 20, thereby to fix the several disks on the shaft 5 and transmit motion from said shaft to the hoisting drum, in the manner before stated. The shifting sleeve or drum is provided with an annular groove adapted to receive a ring 28 having trunnions 29 extending laterally therefrom and arranged to receive the adjacent ends of an operating lever 30 so that by operating the lever 30 the sleeve 25 may be shifted longitudinally of the driving shaft, thereby to actuate the members 23.

The adjacent ends of the split ring 21 are extended laterally to form perforated ears 31 in which are threaded bolts or similar fastening devices 32, whereby the sleeve 21 is rigidly secured to the cylindrical extension 14 of the hub.

It will thus be seen that the intermediate transmitting member or disk 15 is loosely mounted on the cylindrical hub 12 and held against rotation with the disk 11, while the shaft 5 revolves by engagement with the heads of the pin 9, thus permitting free rotation of the driving shaft without affecting the drum 6. It will also be noted that the several power transmitting devices or disks are housed within the annular chamber 8 of the hoisting drum, thus protecting the same against the action of the elements.

While I have shown and described the clutch in connection with the drum of a hoisting engine it is obvious that the same may be employed for imparting movement from any driving element to a driven element without departing from the spirit of the invention.

Having thus described the invention what is claimed is:—

1. A clutch including a driving member, a driven member having a chamber formed in one end thereof, a plurality of pins carried by the driven member and provided with squared heads extending within said chamber, a friction disk keyed to the driving member and provided with a cylindrical hub having a square shoulder terminating in a reduced extension, a second disk mounted on said cylindrical portion and having recesses formed in the peripheral edge thereof for the reception of the squared heads of the pins, a third friction disk having a squared opening formed therein for engagement with the shoulder, a sleeve mounted on the reduced extension, cam levers pivotally mounted on the sleeve, and a shifting spool slidably mounted on the driving member and adapted to actuate the cam levers for moving the several disks in frictional engagement with each other, thereby to transmit motion from the driving member to the driven member.

2. A clutch including a driving member, a driven member provided with a terminal chamber, pins carried by the driven member and provided with squared heads extending within said chamber, a disk keyed to the driving member and provided with a cylindrical hub having a squared shoulder terminating in a reduced extension, a relatively stationary friction disk loosely mounted on the cylindrical hub and provided with oppositely disposed fiber faces, there being recesses formed in the peripheral edge of said disk for the reception of the heads of the pins, a third disk engaging the shoulder of the hub, a sleeve mounted on the extension of said hub, cam levers pivotally mounted on the sleeve, and an actuating spool slidably mounted on the driving member for actuating the cam levers, there being openings formed in the hub carrying disk and arranged to register with the openings in the adjacent disk to permit the passage of the pins.

3. A clutch including a driving member and a driven member one of which is provided with a seating chamber having a gripping pin extending inwardly from one wall thereof, a friction disk seated in said chamber and keyed to the other member, said disk being provided with a cylindrical hub having a squared shoulder terminating in a reduced extension, a second disk surrounding said cylindrical hub and provided with a recess for the reception of the gripping pin, a third friction disk having a squared opening formed therein for engagement with the shoulder, and means carried by the reduced extension of the hub for moving the several disks into frictional contact with each other, thereby to transmit motion from one member to the other.

In testimony that I claim the foregoing as my own, I have hereto affixed my signature in the presence of two witnesses.

WILLIAM DENNIS.

Witnesses:
CHARLES E. ZIMMERMANN,
ERWIN PLEIN NEMMERS.